United States Patent

[11] 3,580,610

| [72] | Inventors | Robert C. Warren<br>26 Salem Ave.,<br>Robert G. Adams, P.O. Box 508,<br>Carbondale, Pa. 18407 |
|---|---|---|
| [21] | Appl. No. | 822,201 |
| [22] | Filed | May 6, 1969 |
| [45] | Patented | May 25, 1971 |

[54] AUTOMATIC ANTIJACKKNIFING CONTROL FOR ARTICULATED VEHICLES
5 Claims, 9 Drawing Figs.

| [52] | U.S. Cl. | 280/432 |
|---|---|---|
| [51] | Int. Cl. | B62d 53/10 |
| [50] | Field of Search | 280/432 |

[56] References Cited
UNITED STATES PATENTS

| 2,201,353 | 5/1940 | Soulis | 280/432 |
|---|---|---|---|
| 3,073,623 | 1/1963 | Owen | 280/432 |
| 3,101,959 | 8/1963 | Adams | 280/432 |

*Primary Examiner*—Leo Friaglia
*Attorney*—Robert G. McMorrow

ABSTRACT: A device for preventing the trailer portion of a vehicle from jackknifing by automatically restraining the trailer portion and the tractor portion of the vehicle from moving relative to each other, except during right- or left-hand steering maneuvers.

PATENTED MAY 25 1971 3,580,610

INVENTORS
ROBERT C. WARREN &
ROBERT G. ADAMS

BY *Robert G. McMorrow*
ATTORNEY

INVENTORS
ROBERT C. WARREN
& ROBERT G. ADAMS
BY Robert G. McMorrow
ATTORNEY

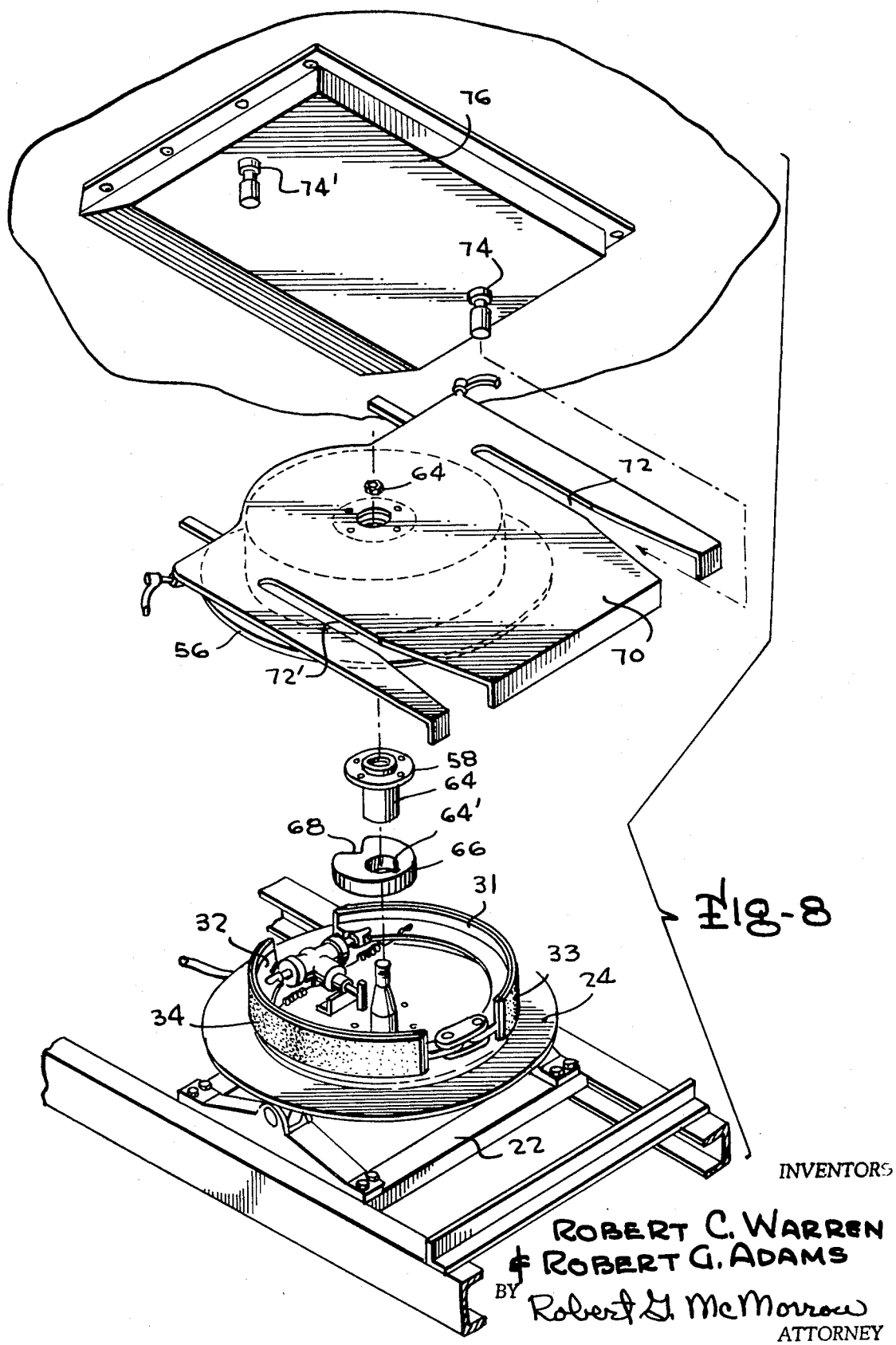

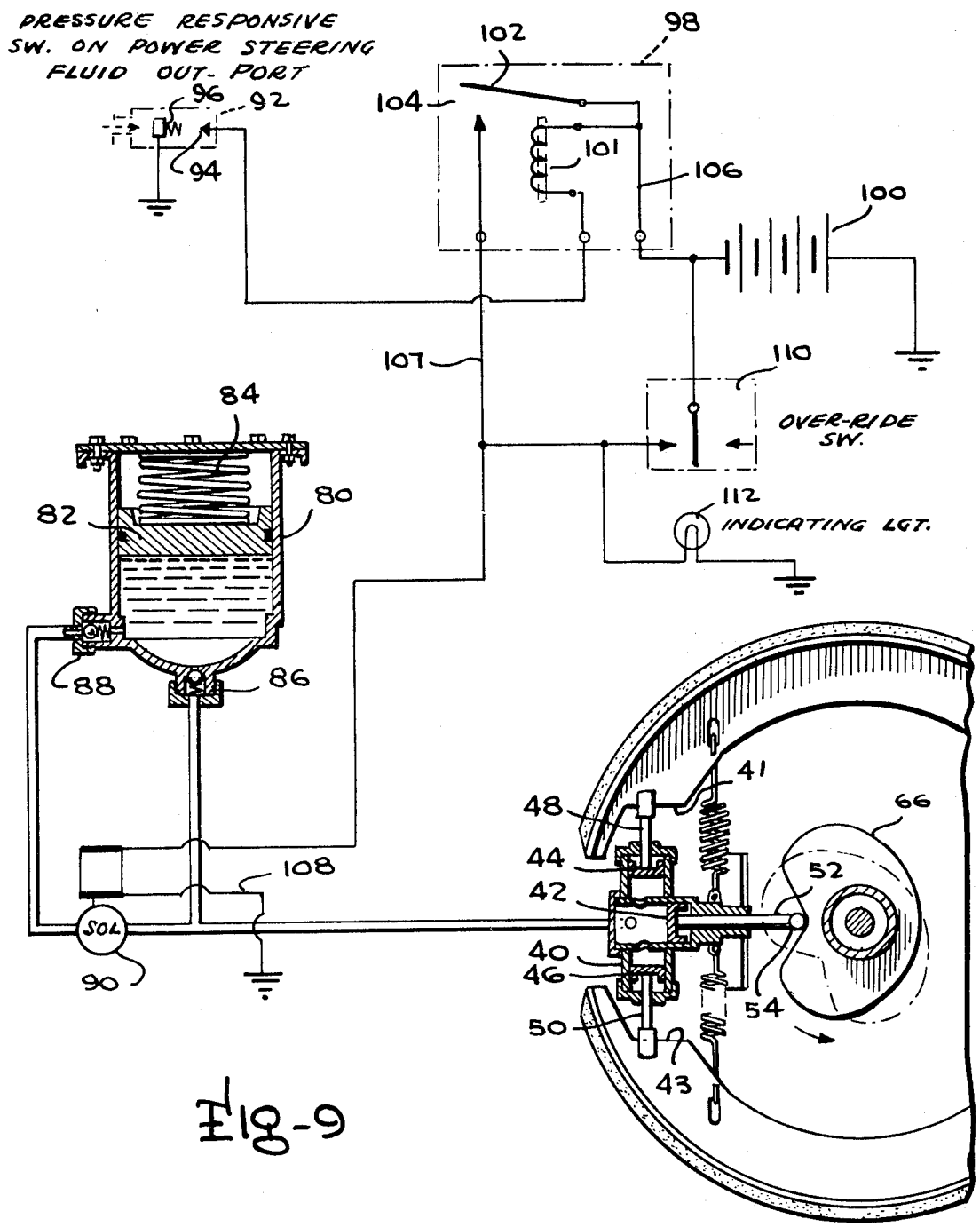

AUTOMATIC ANTIJACKKNIFING CONTROL FOR ARTICULATED VEHICLES

BACKGROUND OF THE INVENTION

1. Field of the Invention

This invention relates to an automatic antijackknifing control for articulated vehicles and more particularly to a device consisting of a drum which is engageable on its outer surface by the trailer portion of the vehicle and whose inner surface is automatically frictionally engaged by a set of brake shoes mounted on the tractor portion of the vehicle which prevents a relative rotation between the tractor and trailer whenever a jackknife condition is starting to develop.

2. Description of the Prior Art

Devices for preventing the jackknifing of a tractor and trailer are not new. Several previous attempts have been made to overcome the dangerous phenomenon of jackknifing which commonly occurs with articulated vehicles when braking on a wet or greasy road surface. Previous attempts to solve the problem have, however, tended to concentrate on devising a system which operated off of the braking system of the articulated vehicle which tended to lock the tractor and trailer together. These prior art devices, however, often resulted in the driver losing control of the vehicle when braking in an emergency. Other prior art devices used complicated gearing arrangements which were very costly. In these prior devices, it has been necessary that the vehicle operator just realize that a condition exists, and that he thereafter employ a physical and mental action to correct that situation.

SUMMARY OF THE INVENTION

This invention is directed to a tractor trailer coupling device which automatically prevents relative movement between the tractor and trailer other than when the driver of the vehicle is engaged in a right or left-hand turn or otherwise desires such relative movement such as when the vehicle is being backed up, etc.

More specifically, the coupling device consists of a mounting plate which is pivotably secured to the tractor portion of the vehicle and which plate has a spindle located in the center of it and protruding upward. The spindle is threaded at its upper end. Surrounding this spindle is a number of shoes which are covered on their outside with high friction material similar to that used in conventional brake lining design.

A large drum very similar to a brakedrum has a hub containing bearings protruding downward inside the drum. The hub and bearings engage the spindle permitting the drum and mounting plate to rotate relative to each other.

Mounted on the outer portion of the inwardly protruding hub is a cam of apple shape which is positioned on the hub such that the point of convergence of the circumference of the cam is pointed toward the front of the tractor whenever the tractor and trailer are aligned. The cam operates a piston located on the stem portion of a tee shape hydraulic cylinder having two opposed pistons in the top portion of the cylinder. Each of the opposed pistons in the cylinder is connected to one of the shoes.

The cylinder is supplied with hydraulic fluid from a small tank having a spring-loaded piston to maintain pressure on the system. The tank has two fluid lines connected to it, each containing a check valve. One check valve only allows fluid to flow out of the tank while the other check valve only permits fluid to flow into the tank.

The fluid line which only permits fluid to flow out of the tank is directly connected to the hydraulic cylinder, whereas, the fluid line which only permits fluid to flow into the tank is connected to the hydraulic cylinder via a solenoid valve.

The solenoid valve is opened when energized by way of a switch which is located in the fluid line of the power steering system of the truck. The switch is closed by hydraulic pressure in the power steering system whenever the driver turns either to the right or left.

Thus, as can be seen, whenever the trailer is aligned with the tractor, the piston in the tank maintains a constant hydraulic pressure on the system, however, whenever the tractor and trailer move relative to each other such as when jackknifing starts, the apple shape cam actuates the piston in the stem of the tee shape hydraulic cylinder, thus expanding the shoes into frictional engagement with the drum preventing jackknifing. When, however, the driver wishes to turn, the solenoid valve is automatically opened permitting fluid to escape from the hydraulic cylinder back into the tank thus allowing the tractor and trailer to move relative to each other.

BRIEF DESCRIPTION OF THE DRAWINGS

FIG. 8 is a perspective view of the elements of the coupling device of the instant invention.

FIG. 9 is a schematic view of the hydraulic and electrical system employed in the instant invention.

DESCRIPTION OF THE PREFERRED EMBODIMENT

Figure 1:
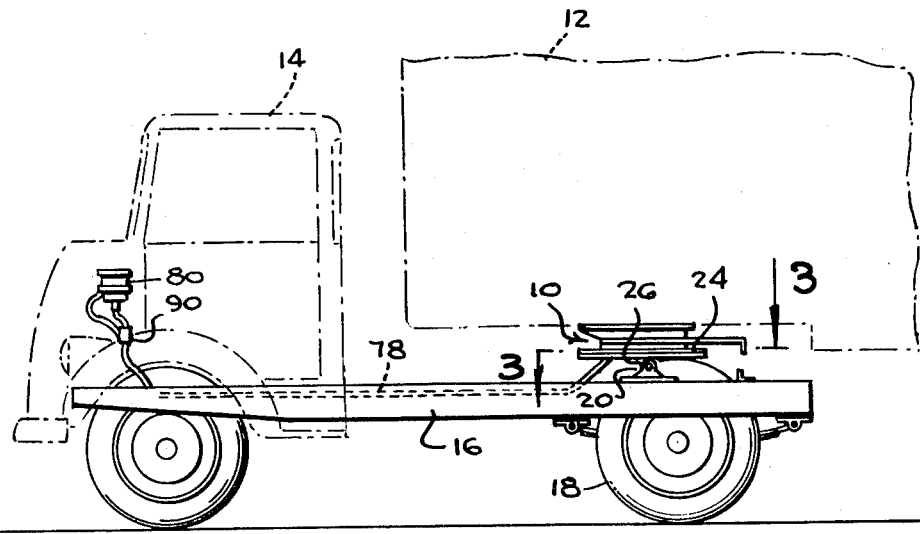
FIG. 1 is a schematic side elevation view of a tractor-trailer unit embodying the connection device of the instant invention.
Figure 3:
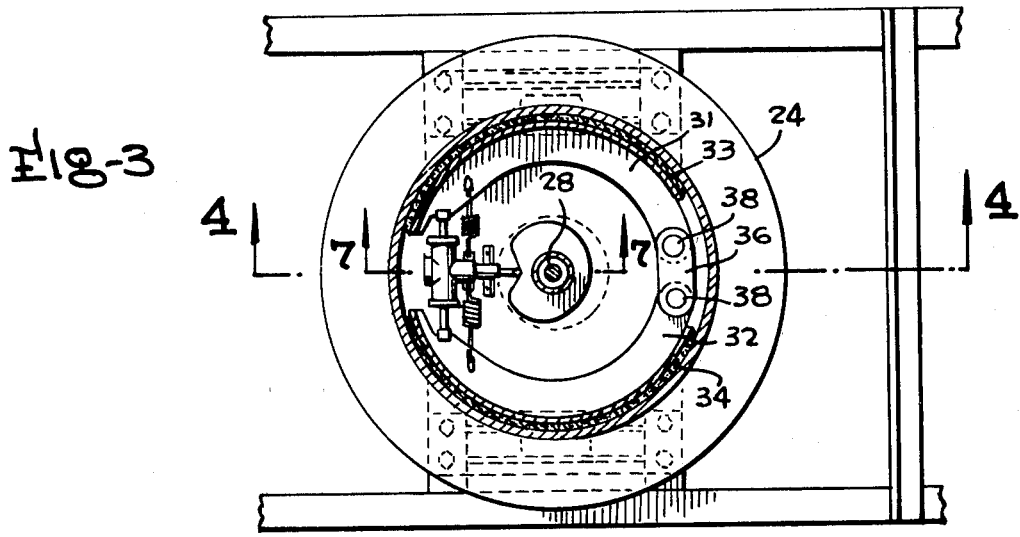
FIG. 3 is a plan sectional view of the coupling device taken about lines 3-3 of FIG. 1.
Figure 2:
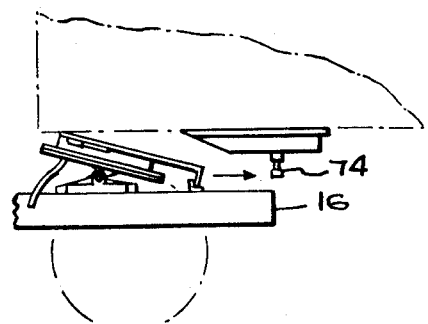
FIG. 2 is a closeup side view of the connection device of the instant invention in its pivoted position to receive the trailer.
Figure 4:
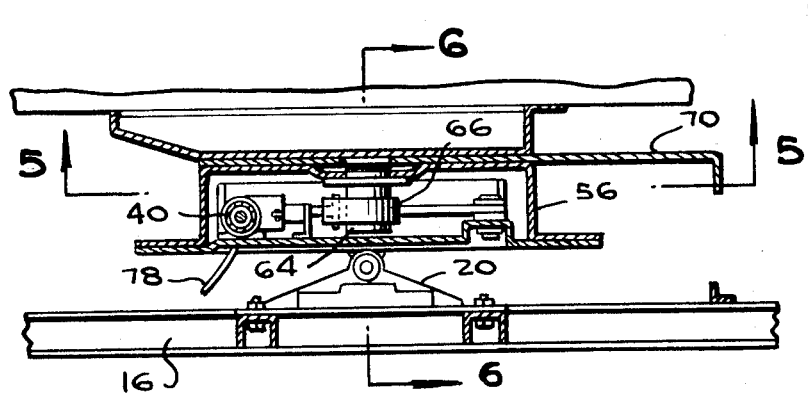
FIG. 4 is a sectional view of the coupling device taken about lines 4-4 of FIG. 3.
Figure 5:
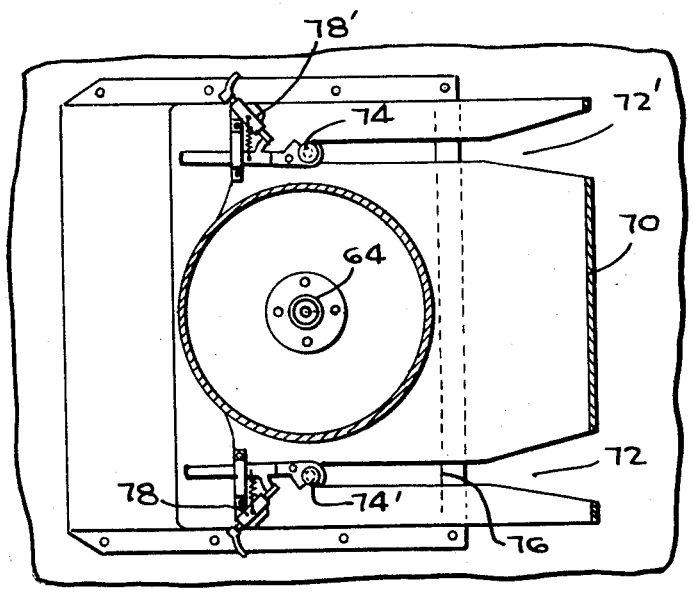
FIG. 5 is a bottom sectional view of the coupling device taken about lines 5-5 of FIG. 4.
Figure 6:
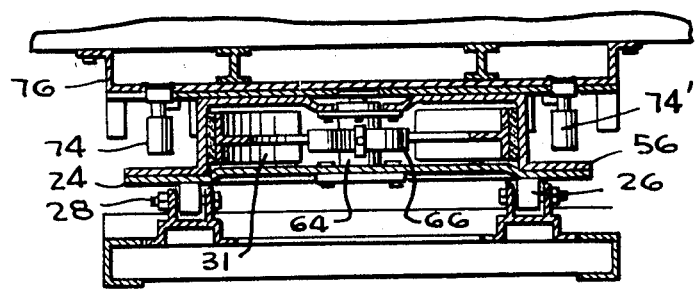
FIG. 6 is an end sectional view of the coupling device taken about lines 6-6 of FIG. 4.
Figure 7:
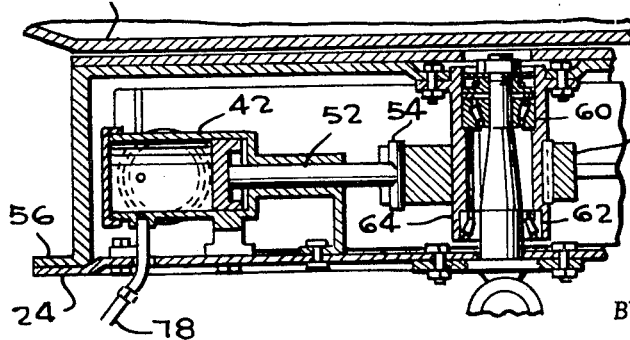
FIG. 7 is a partial sectional view of the hub, hydraulic cylinder, and cam employed in the coupling device and taken about lines 7-7 of FIG. 3.

Referring now specifically to the drawings, it will be seen that the numeral 10 designates the antijackknife coupling device of the present invention used to couple a trailer 12 and a tractor 14 having a frame 16 and rear ground engaging and supporting wheels 18 at the rear end thereof. Generally, the tractor 14 is of conventional design and is equipped with power steering. Secured to the frame 16 is a pair of A-shaped lugs 20 mounted on crossmembers 22. These lugs 20 support the mounting plate 24 of the coupling device having depending lugs 26 with pins 28 extending therethrough, thereby pivotally securing the mounting plate 24 to the frame 16 for pivotal movement about a transverse horizontal axis.

Extending up from the center of the base plate 24 is a spindle 28 having a threaded end portion 30. Two semicircular brake-type shoes 31, 32 are positioned on the base plate 24 equidistant from the spindle 28. The brake-type shoes 31, 32 have secured to their outer surface linings 33 and 34, respectively. One end of each brake-type shoe 31, 32 is pivotally connected together by means of a link 36 and pins 38. Positioned between the other ends 41, 43 of the brake-type shoes 31, 32 is a tee-shaped hydraulic cylinder having three pistons 42, 44, 46, one located in each portion of the tee. Pistons 44 and 46 each have connecting rods 48 and 50 secured thereto and also to the ends 41 and 43 of the brake-type shoes. Secured to piston 42 is an actuating rod 52 having a cam follower 54 located on one end.

A drum 56 having an internal diameter slightly larger than the outer diameter of the brake-type shoes 31, 32 and lining 33, 34 is rotatably mounted on spindle 28 by means of a hub 58. The hub 58 has bearings 60, 62 which engage the spindle 28 and permit the drum 56 to freely rotate. The drum 56 is held in place by nut 64 and threads 30 on the spindle. An apple-shaped cam 66 is secured to the hub 58 by means of key slots 64,64' and a mating key not shown. The point of convergence 68 of the circumference of the cam 66 is located opposite the cam follower 54 and towards the front of tractor 14 whenever the tractor 14 and trailer 12 are aligned, such as when proceeding in a straight line.

Also secured to the drum 56 is a bearing plate 70 having guide slots 72,72' which receive coupling pins 74,74' attached to the coupling plate 76 on the undersurface of trailer 12. The coupling pins 74,74' are held in the guide slots 72,72' by means of latches 78,78'.

Hydraulic fluid is supplied to the hydraulic cylinder 40 from a tank 80 by way of fluid line 78. A one-way check valve 86 located between the tank 80 and the hydraulic cylinder 40 only permits hydraulic fluid to leave the tank 80 and a second one-way check valve 88, which only permits fluid to enter the tank 80, is located between the tank 80 and hydraulic cylinder 40. A solenoid valve 90 is also located between the one-way check valve 88 and the hydraulic cylinder 40. The tank 80 contains a piston 82 which is biased by spring 84 to force the fluid through one-way check valve 86 to the hydraulic cylinder 40.

As can be seen, as the trailer 12 begins to jackknife in either direction, the cam 66 rotates, thus forcing piston 42 into the hydraulic cylinder 40. The fluid in the hydraulic cylinder 40 unable to move through solenoid valve 90 or check valve 86, forces pistons 44, 46 and brake shoes 31, 32 away from each other and against the inside of drum 56, thus preventing the trailer 12 from jackknifing.

In order to allow the tractor-trailer to turn a corner without actuating the antijackknife device of the present invention, a switch 92, which is responsive to hydraulic pressure, is located in one of the hydraulic lines of the power steering system of the truck 14.

As a turn is made, the contacts 94, 96 are placed in contact with each other which energizes the relay 98 and relay coil 101 by means of battery 100. As the coil 101 closes contacts 102 and 104, the solenoid valve 90 is energized to the open position by means of battery 100 via conductors 106, 107 and 108. This opening of solenoid valve 90 permits piston 42 to force the fluid out of the hydraulic cylinder 40 back into the tank 80 by way of one-way check valve 88.

In order to provide for constant energization of the solenoid 90, which may be desirable when the driver is backing up the tractor-trailer, a switch 110 is provided on the dashboard which overrides relay 98 when operated. A blue lamp 112 indicates to the driver that the override switch 110 is closed.

We claim:

1. In combination with a tractor and trailer, an antijackknife coupling comprising:

a coupling plate secured to said trailer and having a plurality of coupling pins depending therefrom;

a baseplate secured to the tractor and having a vertical spindle thereon;

a pair of arcuate brake shoes, positioned on the base plate and having a pair of their adjacent ends pivotally secured together by movable linkage means;

an hydraulic cylinder having three movable pistons mounted on the base plate, and having an actuating rod with a projecting cam follower;

the pistons including one piston secured to the actuating rod, and pistons secured to each of said brake shoes;

a cam, having a central indentation therein mounted on the spindle, the cam follower being engaged against said indentation when the tractor and trailer are aligned;

a drum mounted on the spindle rotatably and secured to the cam, movement of the cam responsive to misalignment of the tractor and trailer resulting in movement of the cam follower and actuating rod and resulting in movement of the pistons secured to the brake shoes to move the brake shoes into contact with the drum; and a bearing plate secured to the drum and having guide slots therein receiving said coupling pins of said coupling plate.

2. In combination with a tractor and trailer, an antijackknife coupling comprising:

a coupling plate secured to said trailer and having a plurality of coupling pins depending therefrom;

a baseplate secured to the tractor and having a spindle thereon;

a pair of brake shoes positioned on the baseplate and having a pair of their adjacent ends pivotally secured together by movable linkage means;

hydraulic cylinder means on the baseplate, including extensible means to contact the brake shoes, and including an actuating rod and a cam follower;

a cam, having a central indentation therein mounted on the spindle, the cam follower being engaged in the said indentation when the tractor and trailer are aligned;

a drum mounted on the spindle rotatably and secured to the cam, movement of the cam responsive to misalignment of the tractor and trailer resulting in movement of the cam follower and actuating rod and resulting in movement of the means contacting the brake shoes to move the brake shoes into contact with the drum; and a bearing plate secured to the drum and having guide slots receiving said coupling pins of said coupling plate.

3. The invention of claim 2, and:

hydraulic supply means for said hydraulic cylinder;

valve means to control the direction of hydraulic flow between the supply means and the cylinder;

and switch means to deactivate the valve means to permit the trailer to corner.

4. The invention of claim 3, and:

a valve control solenoid; and override switch means for constant energization of the valve control solenoid.

5. The invention of claim 4, wherein:

the coupling pins are transversely aligned; and each coupling pin is provided with a latch.